US009309784B2

(12) United States Patent
Wasileski, III et al.

(10) Patent No.: US 9,309,784 B2
(45) Date of Patent: Apr. 12, 2016

(54) POSITIONING ARRANGEMENT HAVING ADJUSTABLE ALIGNMENT CONSTRAINT FOR LOW PRESSURE STREAM TURBINE INNER CASING

(71) Applicant: Siemens Energy, Inc., Orlando, FL (US)

(72) Inventors: Robert F. Wasileski, III, Allison Park, PA (US); Ira J. Campbell, New Richmond, OH (US); Johnny R. Dickson, McKinney, TX (US)

(73) Assignee: SIEMENS ENERGY, INC., Orlando, FL (US)

( * ) Notice: Subject to any disclaimer, the term of this patent is extended or adjusted under 35 U.S.C. 154(b) by 288 days.

(21) Appl. No.: 14/038,835

(22) Filed: Sep. 27, 2013

(65) Prior Publication Data

US 2015/0089782 A1 Apr. 2, 2015

(51) Int. Cl.

| | |
|---|---|
| ***B23P 19/10*** | (2006.01) |
| ***B23P 19/04*** | (2006.01) |
| ***F01D 25/24*** | (2006.01) |

(52) U.S. Cl.

CPC .............. *F01D 25/24* (2013.01); *F01D 25/243* (2013.01); *F05D 2230/64* (2013.01); *Y10T 29/53978* (2015.01)

(58) Field of Classification Search

CPC .......... B23P 19/10; B23P 19/04; F01D 25/24; F01D 25/243; F05D 2230/64

See application file for complete search history.

(56) References Cited

U.S. PATENT DOCUMENTS

| | | | | |
|---|---|---|---|---|
| 4,884,934 A * | 12/1989 | Ikeda | .................... | B23P 19/068 277/434 |
| 5,131,811 A * | 7/1992 | Johnson | ................ | F01D 25/246 415/134 |
| 5,411,306 A | 5/1995 | Campbell et al. | | |
| 6,241,441 B1 | 6/2001 | Erb | | |
| 6,267,556 B1 | 7/2001 | Kikuchi et al. | | |

(Continued)

FOREIGN PATENT DOCUMENTS

| | | | | |
|---|---|---|---|---|
| DK | EP 2192245 A1 * | 6/2010 | .............. | B25B 13/02 |
| GB | 508747 A1 * | 7/1939 | | |

(Continued)

*Primary Examiner* — Lee D Wilson
*Assistant Examiner* — Joel Crandall

(57) ABSTRACT

A positioning arrangement (142), including: an outer casing having a frame member (78); a low pressure steam turbine inner casing (140) having an appendage (60) and a threaded hole through the appendage; and an alignment constraint (10) configured to be positioned in the threaded hole and define a positional relationship between the inner casing and the frame member. The alignment constraint includes a main body (14) and a discrete piggyback body (16), both configured to rotate in the threaded hole as a unitary body when in a joined, end-to-end configuration.

18 Claims, 5 Drawing Sheets

(56) References Cited

U.S. PATENT DOCUMENTS

| | | | | |
|---|---|---|---|---|
| 6,493,936 | B2 | 12/2002 | Doi et al. | |
| 6,702,551 | B2 | 3/2004 | Kikuchi et al. | |
| 7,037,065 | B2 | 5/2006 | Reigl | |
| 7,594,795 | B2 | 9/2009 | Kriz et al. | |
| 8,047,781 | B2 * | 11/2011 | Sullivan | F01D 25/243 411/351 |
| 8,172,528 | B2 | 5/2012 | Kawakami et al. | |
| 8,403,628 | B2 | 3/2013 | Koza et al. | |
| 2006/0188357 | A1 * | 8/2006 | Rowe | F16B 37/044 411/119 |
| 2006/0292003 | A1 | 12/2006 | Kriz et al. | |
| 2008/0080946 | A1 * | 4/2008 | Livingston | F03D 1/001 411/54.1 |
| 2009/0081030 | A1 * | 3/2009 | Sullivan | F01D 25/243 415/182.1 |
| 2009/0126190 | A1 | 5/2009 | Grzondziel et al. | |
| 2011/0005054 | A1 | 1/2011 | Maurell et al. | |
| 2012/0003418 | A1 * | 1/2012 | Oliver | F03D 11/00 428/99 |
| 2013/0078088 | A1 | 3/2013 | Predmore et al. | |

FOREIGN PATENT DOCUMENTS

| | | | | |
|---|---|---|---|---|
| GB | 728400 | A * | 4/1955 | F01D 25/243 |
| JP | 61200311 | A * | 9/1986 | |
| JP | 01273803 | A1 * | 11/1989 | |
| JP | 2002349529 | A1 * | 12/2002 | |
| WO | WO 9641703 | A1 * | 12/1996 | B23P 19/067 |

* cited by examiner

POSITIONING ARRANGEMENT HAVING ADJUSTABLE ALIGNMENT CONSTRAINT FOR LOW PRESSURE STREAM TURBINE INNER CASING

FIELD OF THE INVENTION

The invention relates to an adjustable alignment constraint used as part of a positioning arrangement to concentrically position a low pressure steam turbine inner casing about a rotor.

BACKGROUND OF THE INVENTION

Low pressure steam turbine units include an outer casing having a frame with frame members, and an inner casing positioned on the frame members and about a rotor. It is imperative for proper operation of the steam turbine that the inner casing be aligned concentrically with the rotor axis. This is initially accomplished during site installation of the steam turbine engine by jacking or pulling a finished inner casing into a proper position within the frame of the outer casing. Personnel then hand fit liners (shims) between the inner casing and the frame members for the final required clearance before bolting the finish-machined inner casing into place. This requires that contact surfaces on the inner casing, contact surfaces on the frame members, and contact surfaces on the liners there-between be machined to very close tolerances. This has been acceptable and site schedule and manpower needs were considered in the installation of the new unit. However, even under these ideal conditions, new manufacturing tolerances provided a less-than-ideal situation for achieving the intended fit up of the inner casing with the frame of the outer casing.

The less-than-ideal nature of the current situation can be understood when one considers the multiple facets of just one exemplary conventional positioning arrangement. In the exemplary conventional positioning arrangement several appendages may protrude from the inner casing. Each appendage may have, for example, two prongs, and these two prongs may surround a respective frame member of the outer casing. A liner may be placed between each prong and the respective frame member. This results in a plurality of positioning locations, where each locating includes an appendage surrounding two liners which sandwich a respective frame member. After each prong and each frame member is machined the liners are machined to complete the positioning. This machining step is complex, however, because the contact surface on a prong may or may not be parallel to a respective contact surface on an associated liner. Likewise, the contact surface on the frame member may not be parallel to the contact surface on the prong or a respective contact surface on the liner. As a result, not only is a thickness of the liner to be determined and machined, but an orientation of each of the contact surfaces necessary to achieve the proper positioning is to be determine and machined. Any inaccuracy in the determination or machining of one liner will show up as a change in dimension and/or orientation of another liner, producing a cumulative effect and an even greater need for accuracy.

Once on site, any changes that require repositioning of the inner casing become more complex. For example, in the instance where an upgraded turbine unit is to be installed, some or all of the positioning locations may need to be changed due to a design of the upgraded unit resulting in a relocation of the appendages. In this instance much of the original work done during the original installation in the field can no longer be used. As a result, the new positioning locations must be again fit-up in the field. Even as done during initial installation, this work in the field again presents safety concerns because the machining must be done in place, and the place may require scaffolding and/or awkward positioning to be reached by the field personnel.

In order to simplify this difficult field fit-up process, one solution employs a plurality of bolt-type arrangements. Each bolt-type arrangement is threaded through a threaded hole in a prong and rests on the respective contact surface of the associated frame member. In this manner two prongs sandwich the associated frame member, with or without liners/shims in between. Each bolt-type arrangement has an adjustable foot with a contact surface. The bolt-type arrangement is configured to allow the contact surface of the adjustable foot to adjust as necessary to match an orientation of the respective contact surface on the associated frame member. In this manner the adjustable foot accounts for any misalignment between the prong and the frame member. Where used, this arrangement obviates the need for field personnel to determine dimensions and any misalignments between the prong and the associated frame member required for proper positioning of the inner casing. Since several or all of the positioning locations can have these bolt-type arrangements, the difficulty previously associated with positioning the inner casing is significantly reduced.

Limitations associated with the bolt-type arrangement reduce the number of inner casings where the bolt-type arrangement can be used in all positioning locations. Positioning locations which cannot accommodate the bolt-type arrangement must still be fit using the tedious field machining and manual fit-up procedures. Consequently, there remains room in the art for improvement.

BRIEF DESCRIPTION OF THE DRAWINGS

The invention is explained in the following description in view of the drawings that show.

DETAILED DESCRIPTION OF THE INVENTION

The present inventors have devised an alignment constraint that eliminates the tedious field fit-up procedures associated with installing a steam turbine low pressure inner casing. The alignment constraint includes a feature that enables it to be installed in all positioning locations despite the presence of obstacles that would prevent installation of the conventional bolt-type arrangements. This further streamlines the installation process. Specifically, the alignment constraint of the present invention incorporates two discrete body pieces, a main body and a piggyback body, and a unique interlocking arrangement that permits the main body and the piggyback body to rotate together when joined in an end-to-end configuration, but permits them to move axially relative to each other.

In this manner the main body, which is shorter than the assembly of the main body and the piggyback body, can be inserted into a hole despite a nearby interfering part that might prevent the insertion of the longer, conventional, bolt-type arrangements. Once the main body engages the threads of the hole it can be threaded in as far as necessary to permit the piggyback body to be joined to the main body through the interlocking feature. The two are then turned together as a unitary body and alignment of the inner casing can commence. Allowing relative axial movement permits the bodies to move relative to each other so the threads of the piggyback body can engage the threads of the hole without regard to where on the circumference of the piggyback body the piggyback body's thread begins.

Figure 1:
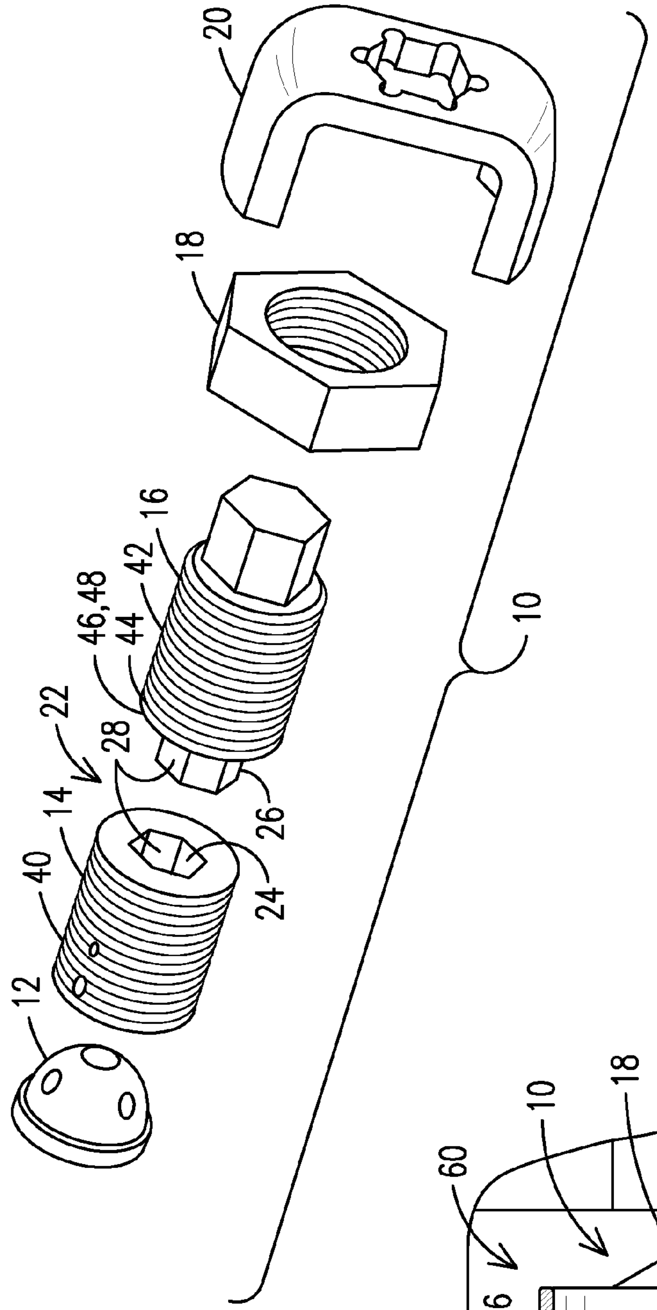
FIG. 1 is a perspective view of an alignment constraint.

FIG. 1 is a perspective view of an exemplary embodiment of the alignment constraint 10. Visible are an adjustable foot 12, a main body 14, a piggyback body 16 which is discrete from the main body 14, a jam nut 18, and a locking cap 20. While either the jam nut 18 or the locking cap 20 can be used alone, in an exemplary embodiment both are used together. When used together, the jam nut 18 assures the piggyback body 16 is rigidly secure and the locking cap 20 is a redundant feature that prevents any loosening of the piggyback body 16 should operational vibration affect the tightness of the threaded members. When joined end-to-end through an interlocking arrangement 22, the main body 14 and the piggyback body 16 form a unitary, threaded body. The interlocking arrangement 22 may include any configuration that prevents relative rotational movement between the main body 14 and the piggyback body 16 when the two are engaged, but permits relative axial movement. In one exemplary embodiment the main body 14 has a hexagonal recess 24 and the piggyback body 16 has a matching hexagonal projection 26. When the bodies are joined together lands 28 of the hexagonal recess 24 and the hexagonal projection 26 engage and prevent relative circumferential movement but permit relative axial movement. Through this arrangement, when the two bodies are joined end-to-end, rotating one will rotate the other, while relative axial movement will permit external main body threads 40 and piggyback body external threads 42 to align with internal threads of a hole into which the alignment constraint 10 is inserted. Without this freedom of relative axial movement, because the internal thread of the hole into which the constraint arrangement 10 is threaded spans both bodies, and the fact that the two bodies are rotationally constrained relative to each other, a peak 44 of the piggyback body external threads 42 would need to be located at the exact proper clocking position 46 at an leading edge 48 to match a clocking position of a valley of the internal threads. Permitting the axial movement allows the piggyback body external threads 42 to be manufactured without regard to the exact clocking position at the leading edge 48. Should there be a mismatch of clocking positions, relative axial movement between the bodies will reposition the leading edge 48 so it can match the internal threads. This represents a cost savings with respect to manufacturing the bodies.

Figure 2:
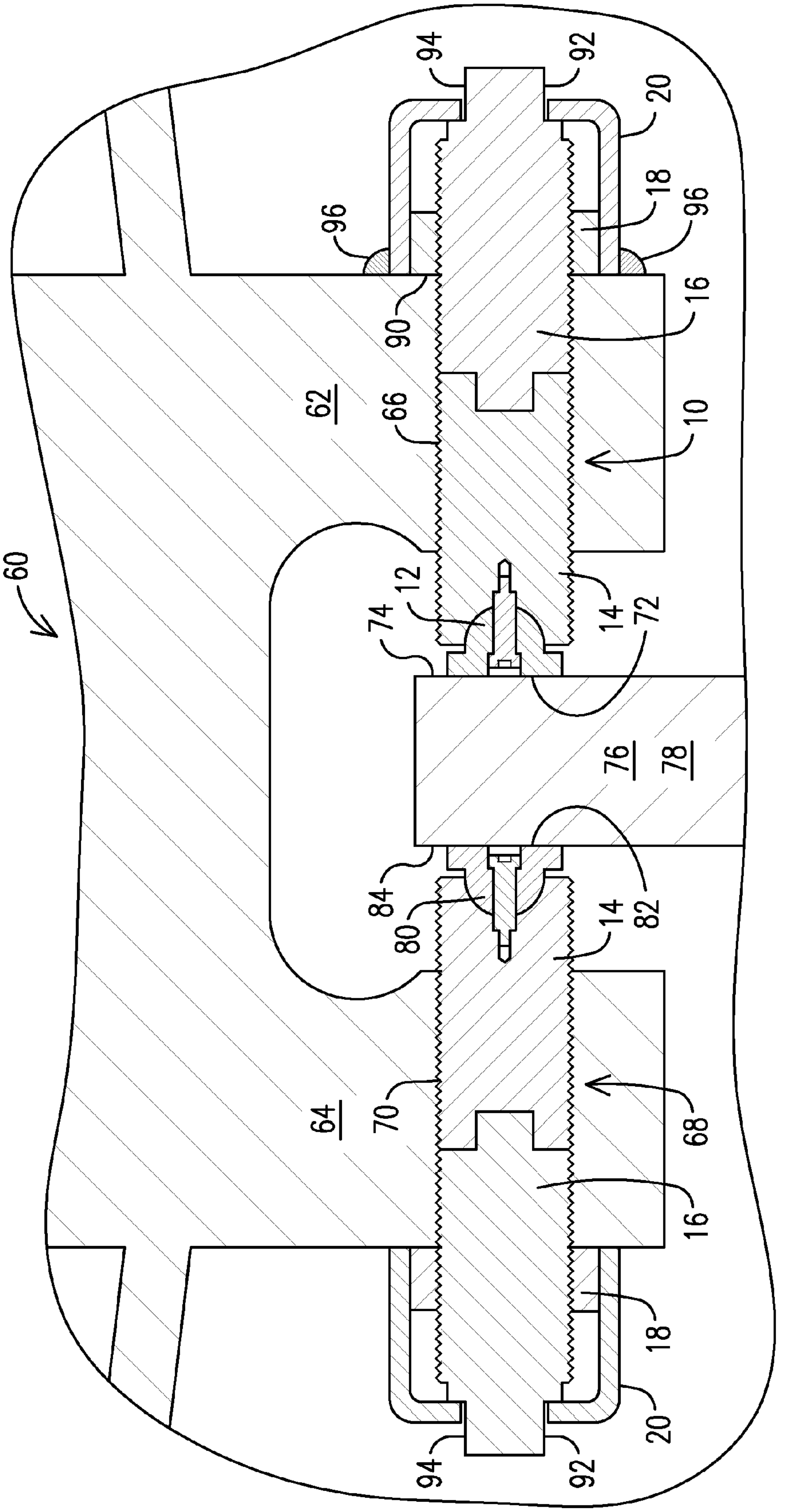
FIG. 2 is a cross section showing opposing alignment constraints disposed in an appendage of a low pressure steam turbine.

FIG. 2 shows an appendage 60 extending from an inner casing. The appendage 60 includes a first prong 62 and an opposing prong 64. The alignment constraint 10 is threaded into an internal thread 66 of the first prong 62 as a unitary body, and an opposing alignment constraint 68 is threaded into an internal thread 70 of the opposing prong 64 as a unitary body. Once threaded into a prong as a unitary body the alignment constraint 10, 68 is considered to be in an installed position. In this exemplary embodiment, the adjustable foot 12 of the first alignment constraint 10 has a first foot contact surface 72 that contacts a first contact surface 74 on a frame member 76. The frame member 76 is part of a frame 78 associated with an external casing (not shown). An opposing adjustable foot 80 associated with the opposing alignment constraint 68 includes an opposing foot contact surface 82 that contacts an opposing contact surface 84 on the frame member 76. In this exemplary embodiment no shims/liners are used between the feet and the frame member 76. However, shims/liners could readily be used if deemed necessary. For example, to fill in a gap or help provide an aligning function should the misalignment of the first contact surface 74 or the opposing contact surface 84 be too great for the adjustable feet alone to accommodate. Any such shim could be rough machined and the adjustable feet can adjust as necessary. Since rough machining of the shim is less time consuming that rough and finish machining, this method would lead to a reduced amount of fit-up time.

It can be seen that once the alignments constraints are positioned as shown in FIG. 2, advancing the first alignment constraint 10 and withdrawing the opposing alignment constraint 68 will move the appendage 60 to the right when the frame member 76 is fixed, as it is in this exemplary embodiment. Likewise, withdrawing the first alignment constraint 10 and advancing the opposing alignment constraint 68 will move the appendage 60 to the left. In this manner adjustments to the inner casing can be achieved.

Once a final position is determined, the alignment constraint 10 can be locked into position via at least one of the jam nut 18 and the locking cap 20. The jam nut may be tightened so that it abuts an abutting surface on the first prong 62. This creates a friction lock that holds the piggyback body 16 in place which, in turn, holds the main body 14 in place. In addition or alternately, the locking cap 20 may be used and may include an interlocking feature 92 configured to interlock with a feature on the piggyback body, such as a head 94. The head 94 may be hexagonal or any other shape that can be used to rotate the alignment constraint 10. The locking cap 20 may be tack welded to the appendage 60 via a weld 96. Likewise, the jam nut 18 may be similarly tack welded. The weld 96 and the interlocking feature 92 lock the piggyback body 16 and hence the main body 14 in position. Likewise, a jam nut 18 and a locking cap 20 associated with the opposing alignment constraint 68 operate to lock the opposing alignment constraint 68 into place.

Figure 3:
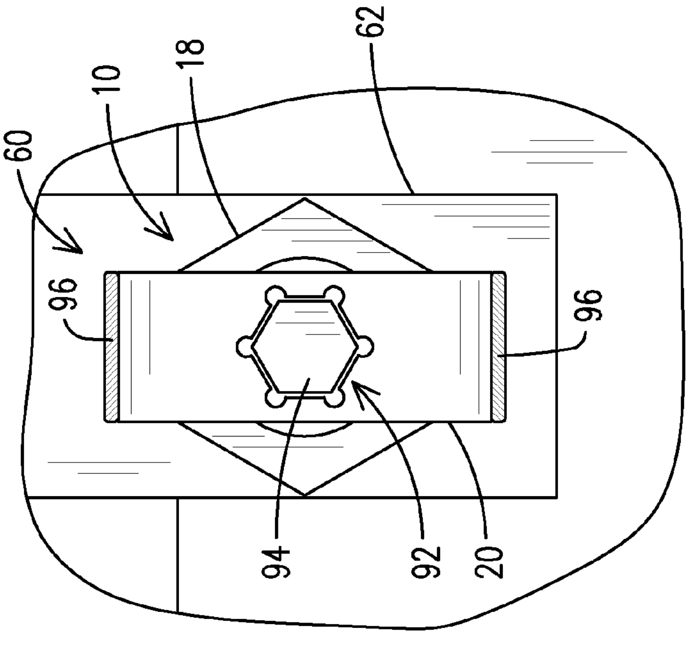
FIG. 3 is an end view of one alignment constraint of FIG. 2.

FIG. 3 shows an end view of the alignment constraint 10 of FIG. 2. Visible are the appendage 60, the first prong 62, the jam nut 18, the locking cap 20 and associated welds 96, the interlocking feature 92, and the head 94.

Figure 4:
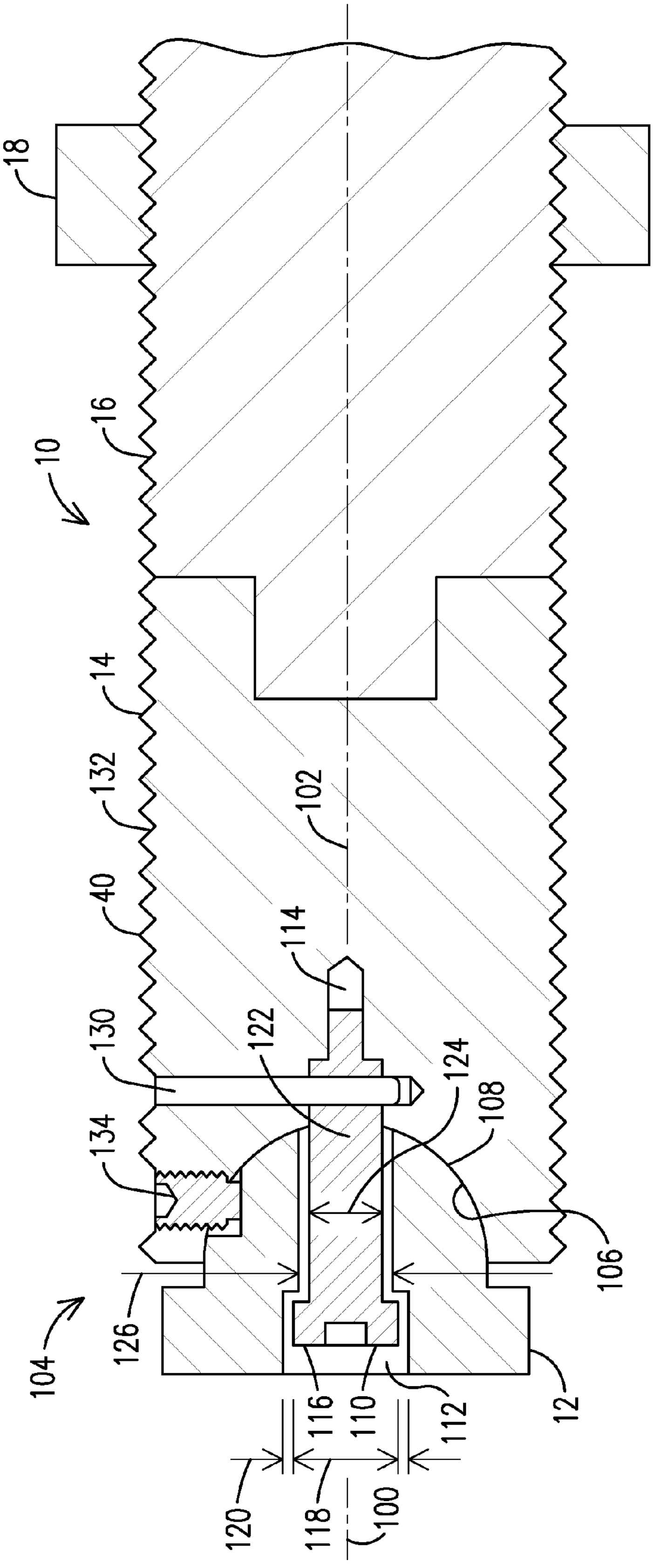
FIG. 4 is an exploded cross section of an alternate exemplary embodiment of the alignment constraint.

FIG. 4 shows an exploded cross section of the adjustable foot 10 and the main body 14. The adjustable foot 10 has a foot longitudinal axis 100 and the main body 14 has a main body longitudinal axis 102 which coincides with the foot longitudinal axis 100 when both are in a design position 104 as shown. The adjustable foot 10 has a convex spherical surface 106 that slides on a concave spherical surface 108 of the main body 14. The cooperation of the surfaces 106, 108 permits the adjustable foot 10 to rotate, thereby allowing the foot longitudinal axis 100 and the main body longitudinal axis 102 to misalign. In this exemplary embodiment the adjustable foot 10 is secured to the main body 14 via a retention screw 110 that fits into a through-hole 112 in the adjustable foot 10 and threads into a retention screw recess 114 in the main body 14. A retention screw head 116 comprises a retention screw head diameter 118 that is less than a first diameter 120 of the through-hole 112 in the adjustable foot 10. A retention screw shank 122 comprises a retention screw shank diameter 124 that is less than a second diameter 126 of the through-hole 112. These diameters are sized to permit a the foot longitudinal axes 100 to deviate from the main body longitudinal axis 102 by, for example, up to 2 degrees or more.

In this exemplary embodiment a retention screw locking pin 130 can be installed through a side wall 132 of the main body 14 and through the retention screw shank 122 to prevent the retention screw 110 from backing out during operation of the steam turbine. Similarly, a foot anti-rotation set screw 134 can be installed through the side wall 132 of the main body 14 to press against the adjustable foot 10 to prevent it from rotation about the adjustable foot longitudinal axis 100. The alignment constraint 10 may be neither, one, or both of the retention screw locking pin 130 and the foot anti-rotation set screw 134.

Figure 5:
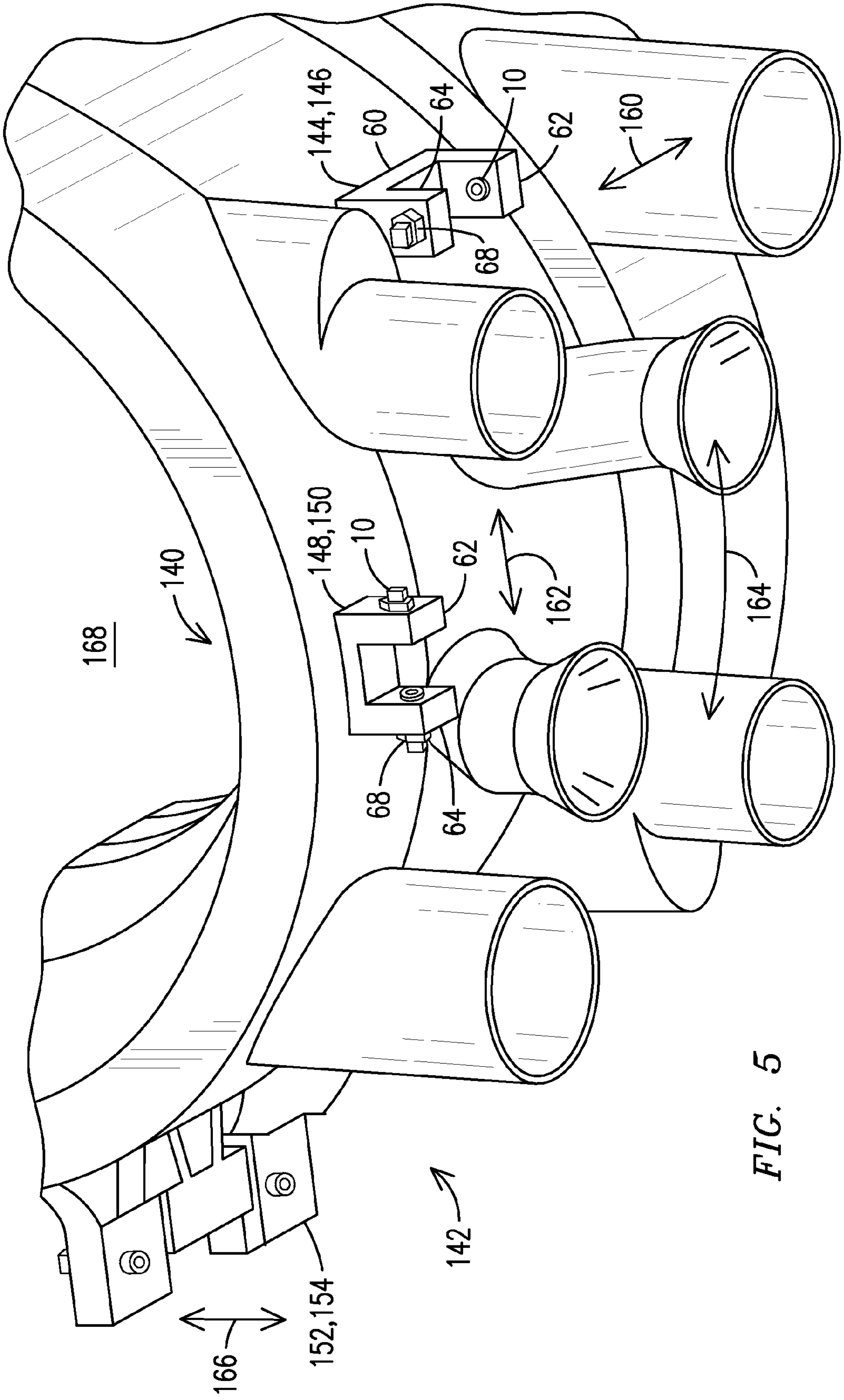
FIG. 5 is a perspective view of a bottom of a low pressure steam turbine showing an axial alignment appendage, a transverse alignment appendage, and a vertical alignment appendage.

FIG. 5 shows a perspective view of a bottom of the inner casing 140 showing a positioning arrangement 142. In this exemplary embodiment the positioning arrangement 142 includes: an axial position assembly 144 disposed at an axial position location 146; a transverse position assembly 148 disposed at a transverse position location 150; and a vertical position assembly 152 disposed at a vertical position location 154. While only one of each assembly is shown, there may be two or more of each assembly at various position locations. In this exemplary embodiment each position assembly includes an appendage 60 having a first prong 62 and an opposing prong 64, an alignment constraint 10 through the first prong 62, and an opposing alignment constraint 68 through the opposing prong 64. Adjustment of the axial position assembly 144 will adjust an axial position of the inner casing 140 in an axial direction 160. Adjustment of the transverse position assembly 148 will adjust a transverse position of the inner casing in a transverse direction 162. In an exemplary embodiment where there are two transverse position assemblies 148, they can be adjusted in cooperation with each other to rotate the inner casing 140 in a rotational direction 164. Adjustment of the vertical position assembly 152 will adjust a vertical position of the inner casing 140 in a vertical direction 166. In an exemplary embodiment where there are two vertical position assemblies 152, they can also be adjusted in cooperation with each other to rotate the inner casing 140 in a rotational direction 164. Together these assemblies can be used to fully define a positional relationship between the inner casing 140 and the outer casing (not shown), including defining the axial position, the transverse position, a vertical position, and the clocking orientation (rotational position). This freedom of positioning permits much greater precision when aligning the inner casing 140 to be concentric with a longitudinal axis of a rotor shaft running through a cavity 168 of the inner casing 140.

Figure 6:
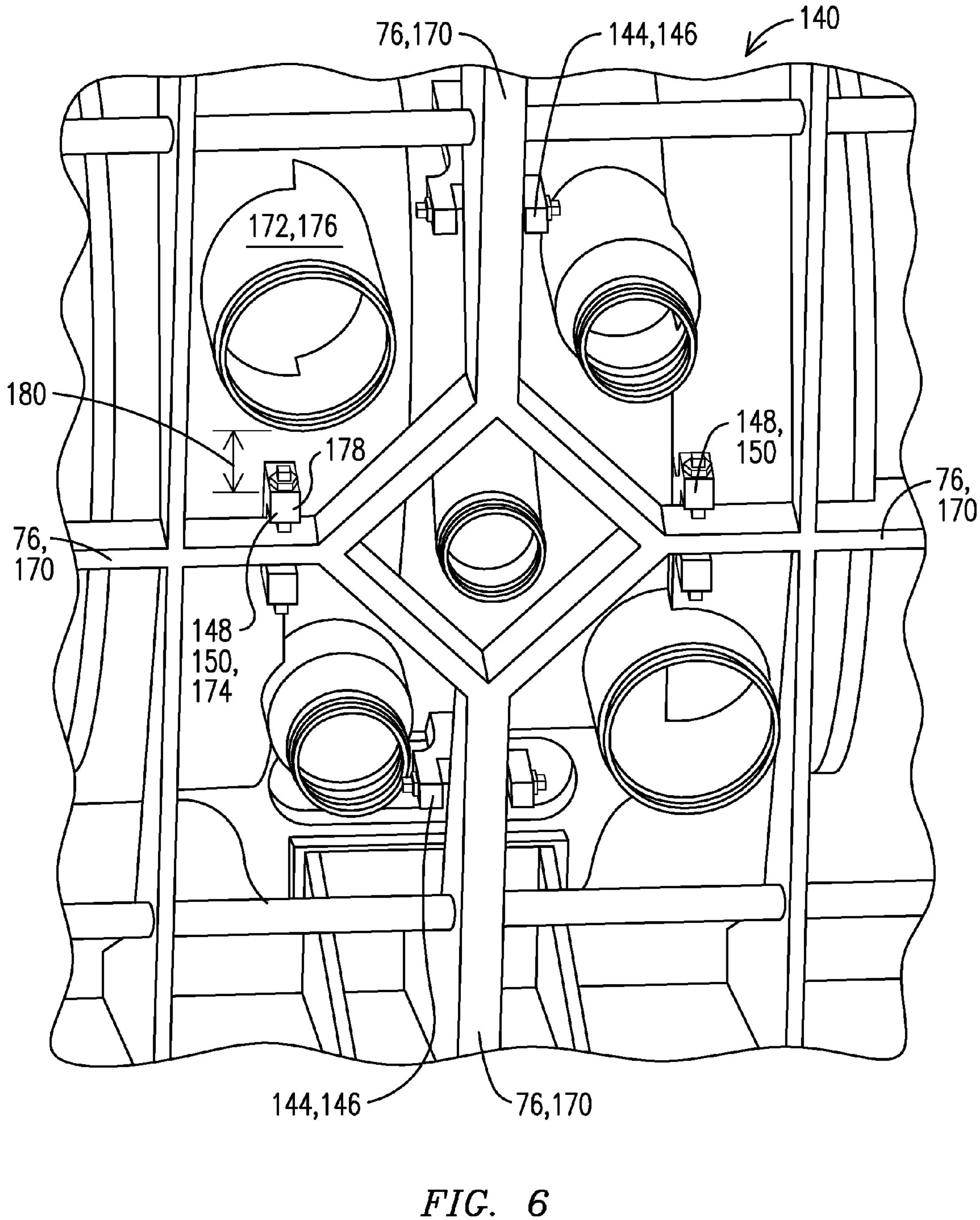
FIG. 6 is a perspective view of a bottom of the low pressure steam turbine of FIG. 4 mounted in a frame of an outer casing.

FIG. 6 shows the inner casing 140 secured to the frame members 76 of the frame 170. In certain inner casing configurations there may be projections 172 such as piping or other structure necessary for proper operation of the steam turbine. The arrangement of these projections 172 may put them close to some of the positioning locations. For example, an obstructed transverse position assembly 174 is located proximate an interfering projection 176. An obstructed prong 178 is located closest to the interfering projection 176 at a distance 180 that is less than a length of the alignment constraint 10 when joined as a unitary body. In this configuration it would be impossible to install the joined unitary body, or the conventional bolt-type arrangement because they are both longer than the distance 180. However, in to the two-piece design the main body 14 and the piggyback body 16 are each characterized by a length that is shorter than the distance 180 between the obstructed prong 178 and the interfering projection 176. As a result, the main body 14 can be threaded into the obstructed prong 178 until there is enough clearance between the main body 14 and the interfering projection 176 for the piggyback body 16. When there is enough clearance the piggyback body 16 can be interlocked with the main body 14 and the two can be threaded into the obstructed prong 178 as the unitary body. In this way the alignment constraint 10 can be installed in an obstructed prong 178 which is not possible with the conventional bolt-type arrangement.

From the foregoing it is apparent that the inventors have created a clever, yet inexpensive and easy-to implement constraint arrangement that overcomes problems associated with other arrangements. This arrangement will further allow for reduced fit-up times, improved fit, and increased safety. Consequently, this represents a significant improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A positioning arrangement, comprising:

an outer casing comprising a frame member;

a low pressure steam turbine inner casing comprising an appendage and a threaded hole through the appendage; and an alignment constraint configured to be positioned in the threaded hole and to define a positional relationship between the inner casing and the frame member, wherein the alignment constraint comprises a main body, a discrete piggyback body, and an interlocking arrangement configured to permit relative axial movement between the bodies and prevent relative rotational movement between the bodies when the bodies are in an end to end configuration, wherein both bodies are configured to rotate in the threaded hole as a unitary body when in the joined, end-to-end configuration.

2. The positioning arrangement of claim 1, wherein the interlocking arrangement comprises a projection associated with one of the bodies and a receptacle for the projection associated with the other of the bodies.

3. The positioning arrangement of claim 1, further comprising a foot disposed between the main body and a contact surface on the frame member on which the foot rests, wherein the alignment constraint is configured to permit misalignment of a longitudinal axis of the foot with a longitudinal axis of the main body.

4. The positioning arrangement of claim 3, further comprising a retention screw configured to secure the foot to the main body, and a retention screw locking pin configured to prevent rotation of the retention screw.

5. The positioning arrangement of claim 3, further comprising an anti-rotation set screw configured to prevent relative circumferential motion between the foot and the main body.

6. The positioning arrangement of claim 1, further comprising a jam nut configured to thread onto the piggyback body and abut an abutting surface of the appendage adjacent the threaded hole.

7. The positioning arrangement of claim 1, wherein the piggyback body further comprises a head and a locking cap configured to interlock with the head and contact the appendage.

8. The positioning arrangement of claim 7, further comprising a weld securing the locking cap to the appendage.

9. The positioning arrangement of claim 1, wherein the appendage comprises a first prong comprising the threaded hole and an opposing prong comprising an opposing prong threaded hole and an opposing alignment constraint, and wherein the alignment constraint and the opposing alignment constraint sandwich the frame member.

10. The positioning arrangement of claim 1, comprising: a second appendage comprising a second threaded hole, and a second alignment constraint; and a third appendage comprising a third threaded hole, and a third alignment constraint, wherein each alignment constraint adjusts one of an axial position, a vertical position, and a clocking position of the inner casing.

11. An alignment constraint configured to define a positional relationship between a low pressure steam turbine inner casing of a steam turbine and a frame member of an outer casing during operation of the steam turbine, the alignment constraint comprising an externally threaded body, a rotably adjustable foot disposed at a foot end of the threaded body, and a head at a head end of the threaded body, the improvement comprising:

a main body and a discrete piggyback body that when positioned end-to-end cooperate through an interlocking arrangement to form the externally threaded body, wherein when interlocked, the interlocking arrangement prevents relative rotational movement between the main body and the threaded body, but permits relative axial movement.

12. The alignment constraint of claim 11, wherein the interlocking arrangement comprises a hexagonal projection disposed on the piggyback body and a matching hexagonal recess disposed in the main body.

13. The alignment constraint of claim 11, further comprising a retention screw configured to secure the foot to the main body and to permit misalignment of a longitudinal axis of the foot with a longitudinal axis of the externally threaded body when the retention screw is in an installed position.

14. The alignment constraint of claim 13, further comprising a retention screw locking pin configured to prevent rotation of the retention screw from the installed position.

15. The alignment constraint of claim 11, further comprising an anti-rotation set screw configured to prevent rotation of the foot about a longitudinal axis of the foot.

16. The alignment constraint of claim 11, further comprising a locking cap configured to interlock with the head.

17. A positioning arrangement, comprising:

an outer casing comprising a frame member;

a low pressure steam turbine inner casing comprising an appendage comprising a first prong and an opposing prong;

an alignment constraint configured to be disposed in a threaded hole in the first prong; and an opposing alignment constraint configured to be disposed in a threaded hole in the opposing prong;

wherein at least one of the alignment constraints comprises a main body and a discrete piggyback body configured to rotate together as a unitary body when in a joined, end-to-end configuration, wherein each alignment constraint comprises a foot that contacts the frame member, and wherein the feet sandwich the frame member.

18. The positioning arrangement of claim 17, comprising a plurality of appendages, at least one alignment constraint, and a plurality of opposing alignment constraints, wherein the positioning arrangement is configured to fully define a positional relationship between the inner casing and the outer casing.

* * * * *